(12) United States Patent
Chiang (10) Patent No.: US 9,116,287 B2
(45) Date of Patent: Aug. 25, 2015

(54) LENS STRUCTURE

(75) Inventor: Cheng-Nan Chiang, Taipei (TW)

(73) Assignee: ABILITY ENTERPRISE CO., LTD., Taipei (TW)

( * ) Notice: Subject to any disclaimer, the term of this patent is extended or adjusted under 35 U.S.C. 154(b) by 162 days.

(21) Appl. No.: 13/593,015

(22) Filed: Aug. 23, 2012

(65) Prior Publication Data

US 2013/0083410 A1    Apr. 4, 2013

(30) Foreign Application Priority Data

Sep. 30, 2011 (TW) .............................. 100135638 A (51) Int. Cl.
*G02B 7/04* (2006.01)
*G02B 7/10* (2006.01)

(52) U.S. Cl.
CPC .. *G02B 7/10* (2013.01); *G02B 7/04* (2013.01); *G03B 2205/0046* (2013.01); *G03B 2205/0092* (2013.01)

(58) Field of Classification Search
CPC ... G02B 7/04; G02B 7/09–7/10; G02B 7/102; G02B 15/14–15/15
USPC .......................................... 359/825, 700, 704
See application file for complete search history.

(56) References Cited

U.S. PATENT DOCUMENTS

| | | | |
|---|---|---|---|
| 6,954,314 B2 | 10/2005 | Nomura et al. | |
| 7,039,308 B2 | 5/2006 | Nomura | |
| 7,062,163 B2 | 6/2006 | Nomura | |
| 7,085,487 B2 | 8/2006 | Nomura | |
| 7,212,352 B2 | 5/2007 | Nomura | |
| 7,408,722 B2 | 8/2008 | Ishizuka et al. | |
| 2001/0017737 A1* | 8/2001 | Nomura et al. | 359/700 |
| 2001/0017738 A1 | 8/2001 | Nomura et al. | |
| 2007/0009246 A1 | 1/2007 | Lee | |
| 2010/0002309 A1* | 1/2010 | Nagae | 359/699 |
| 2011/0001872 A1* | 1/2011 | Honsho et al. | 348/362 |
| 2012/0327519 A1* | 12/2012 | Kang et al. | 359/695 |

FOREIGN PATENT DOCUMENTS

| | | |
|---|---|---|
| TW | I234672 B | 6/2005 |
| TW | 200619718 A | 6/2006 |
| TW | 200624903 A | 7/2006 |
| TW | 200624904 | 7/2006 |
| TW | I269903 B | 1/2007 |
| TW | I269904 B | 1/2007 |
| TW | I269905 B | 1/2007 |
| TW | 200942958 A | 10/2009 |
| TW | I328695 B | 8/2010 |

* cited by examiner

*Primary Examiner* — Thomas K Pham
*Assistant Examiner* — Marin Pichler
(74) *Attorney, Agent, or Firm* — Rabin & Berdo, P.C.

(57) ABSTRACT

The lens structure comprises a first barrel, a second barrel and a third barrel. The second barrel has a first guiding groove and comprises a first pin. The third barrel has a second guiding groove and a second pin. The first barrel is rotatably disposed outside of the third barrel, and the second barrel is translatably but not rotatably disposed inside of the third barrel. The first pin of the second barrel slides along the second guiding groove of the third barrel, and the second pin of the third barrel slides along the first guiding groove of the second barrel.

20 Claims, 10 Drawing Sheets

LENS STRUCTURE

This application claims the benefit of Taiwan application Serial No. 100135638, filed Sep. 30, 2011, the subject matter of which is incorporated herein by reference.

BACKGROUND OF THE INVENTION

1. Field of the Invention

The invention relates in general to a lens structure, and more particularly to a multi-barrel lens structure.

2. Description of the Related Art

Along with the advance in technology, digital camera mechanism has been widely used in various digital products such as digital camera, digital video recorder, mobile phone, personal digital assistant (PDA). The digital camera mechanism comprises a lens structure and an image sensor. The lens structure focuses an image on the image sensor, which then converts an optical image signal into an electrical signal.

Conventional lens structure comprises a number of barrels which move relatively to each other. A straight forwarding barrel of the barrels has a groove, which defines an optical zooming path. Through the groove, the straight forwarding barrel may move in a straight line to zoom in and/or zoom out.

However, the guiding pin of the first barrel must remain being connected to the guiding groove of the second barrel to regulate the movement path of the first barrel. Since the guiding pin must remain being connected to the guiding groove, the guiding pin is thus restricted by the movement path of the first barrel, and the optical zooming path cannot be prolonged further.

SUMMARY OF THE INVENTION

The invention is directed to a lens structure and an image capturing device using the same. In an embodiment, under the circumstances that the optical zooming path is prolonged, the movement path of the barrel still can be regulated.

According to an embodiment of the present invention, a lens structure is provided. The lens structure comprises a first barrel, a second barrel and a third barrel. The second barrel has a first groove and comprises a first pin. The third barrel has a second groove and a second pin. The first barrel is disposed outside of the third barrel, and the second barrel is disposed inside of the third barrel. The second pin slides along the first groove while the first pin is detached from the second groove, and/or the first pin slides along the second groove while the second pin is detached from the first groove.

According to an embodiment of the present invention, a lens structure is provided. A lens structure comprises an inner barrel and an outer barrel. The inner barrel comprises a first groove group and a first pin group. The outer barrel comprises a second groove group and a second pin group. The inner barrel is disposed inside of the outer barrel, the first pin group slides along the second groove group, and the second pin group slides along the first groove group.

According to an embodiment of the present invention, a lens structure is provided. The lens structure comprises a first barrel, a second barrel and a third barrel, wherein the first barrel is disposed outside of the third barrel, the second barrel is disposed inside of the third barrel, and the lens structure comprises a first pin group of the second barrel sliding along a second groove group of the third barrel, a second pin group of the third barrel sliding along a first groove group of the second barrel. Wherein, the second pin group slides along the first groove group while the first pin group is detached from the second groove group, and the first pin group slides along the second groove while the second pin group is detached from the first groove group.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
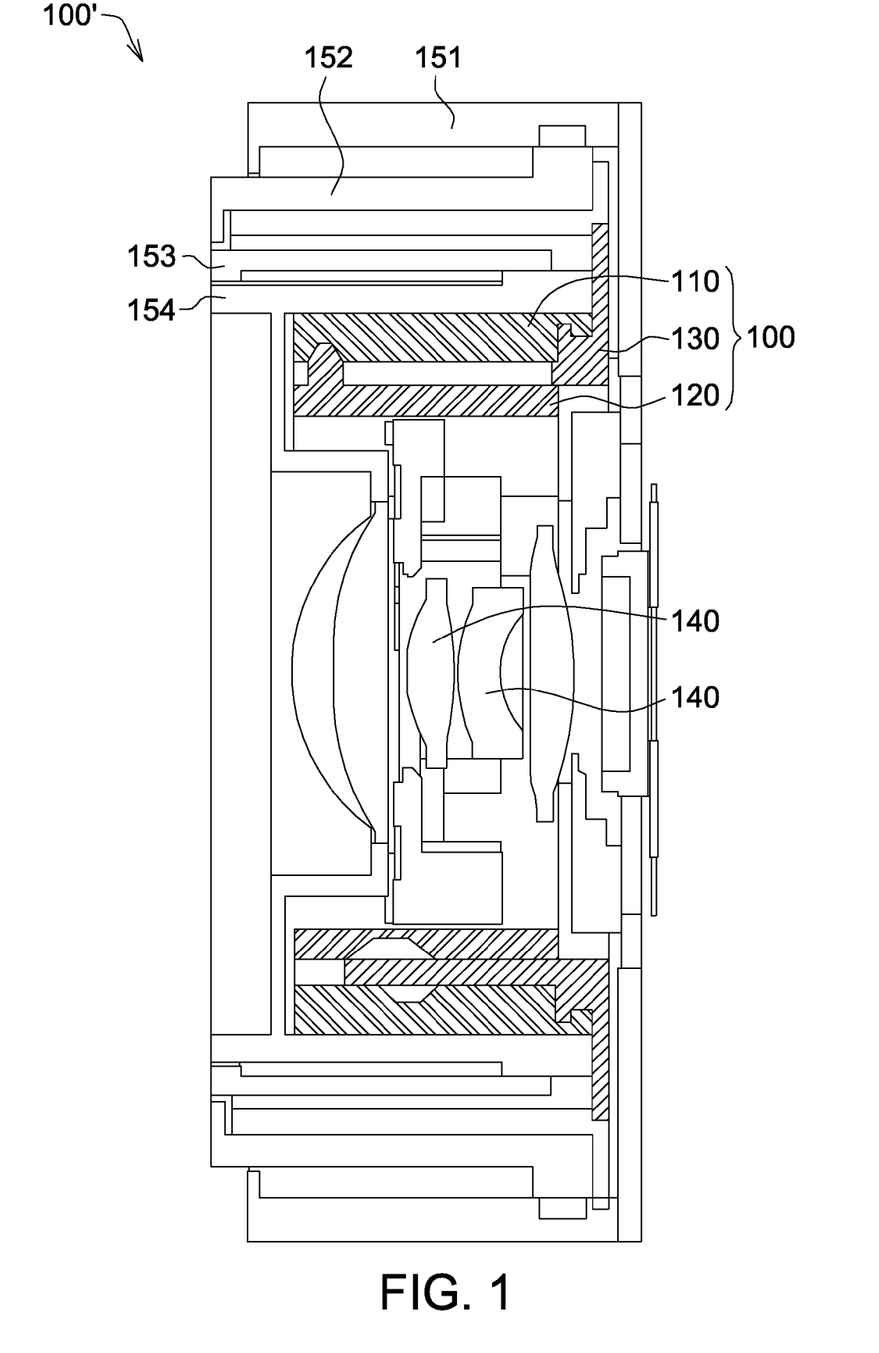
FIG. 1 shows a cross-sectional view of an image capturing device according to an embodiment of the invention.

Referring to FIG. 1, a cross-sectional view of an image capturing device according to an embodiment of the invention is shown. The image capturing device 100' is an electronic device with image capturing function, and may be realized by such as digital camera, digital video recorder, mobile phone or personal digital assistant (PDA). The image capturing device 100' comprises a lens structure 100 and at least one lens 140. The lens 140 may be realized by a concave lens or a convex lens.

As indicated in FIG. 1, the lens structure 100 comprises a first barrel 110, a second barrel 120 and a third barrel 130. The lens 140 is disposed inside of the second barrel 120. By rotating the first barrel 110, the second barrel 120 is driven to change the position of the lens 140, which is switched between a close end, a wide-angle end and a telephoto end. The first barrel 110 may rotate around the Z-axis such as the direction of the optical axis.

Besides, the lens structure 100 may additionally comprise barrels 151, 152, 153 and 154, which may perform forward movement and/or rotation movement. Or, the barrel 151 is fixed on the casing or becomes a part of the casing. Each of two connected barrels has a guiding groove and/or a guiding pin. Through the relative movement between the guiding groove and the guiding pin, the two connected barrel performs predetermined rotation movement and/or forward movement. In an embodiment, degree of freedom (DOF) in movement for the lens structure 100 is 1. The movement of the barrels 151-154 depends on the design of the lens structure 100, and the invention is not limited thereto. In addition, the barrels 151-154 may be linked or fixed to at least one of the first barrel 110, the second barrel 120 and the third barrel 130.

Figure 2:
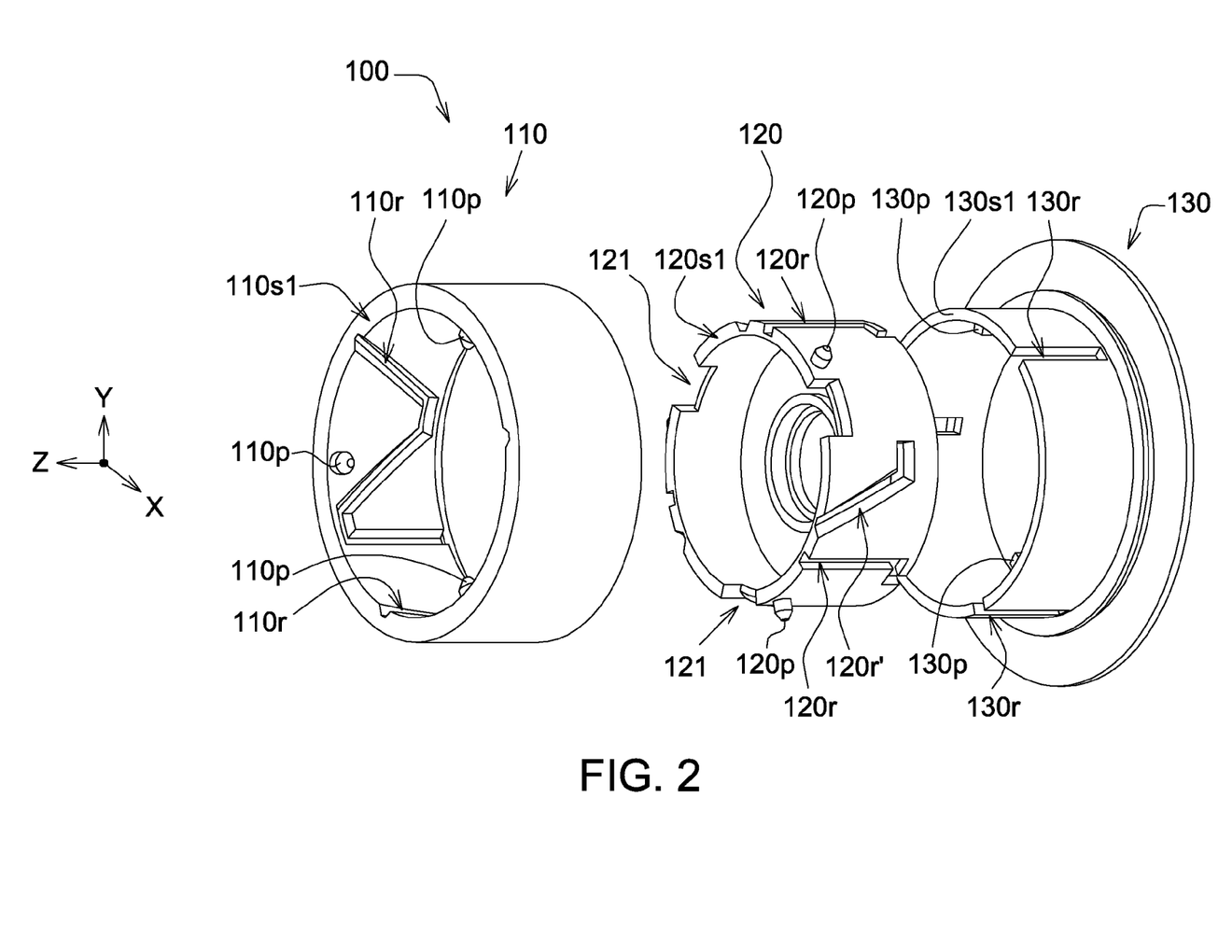
FIG. 2 shows a de-composition diagram of the lens structure of FIG. 1.

Referring to FIG. 2, shows a de-composition diagram of the lens structure of FIG. 1 is shown. The second barrel 120 has at least one first groove 120r constituted a first groove group and comprises at least one first pin 120p constituted a first pin group.

The third barrel 130 has at least one second groove 130r constituted a second groove group and at least one second pin 130p constituted a second pin group. The third barrel 130 has a third surface 130s1, and the second groove 130r extends from the third surface 130s1. The first barrel 110 is disposed outside of the third barrel 130. The second barrel 120 is disposed inside of the third barrel 130. The first pin 120p of the second barrel 120 slides along the second groove 130r of the third barrel 130. The second pin 130p of the third barrel 130 slides along the first groove 120r of the second barrel 120. Besides, the third barrel 130 may be fixed on the casing (not illustrated) of an optical image capturing lens device.

The second pin 130p slides along the first groove 120r while the first pin 120p is detached from the second groove 130r, and/or the first pin 120p slides along the second groove 130r while the second pin 130p is detached from the first groove 120r.

Figure 3:
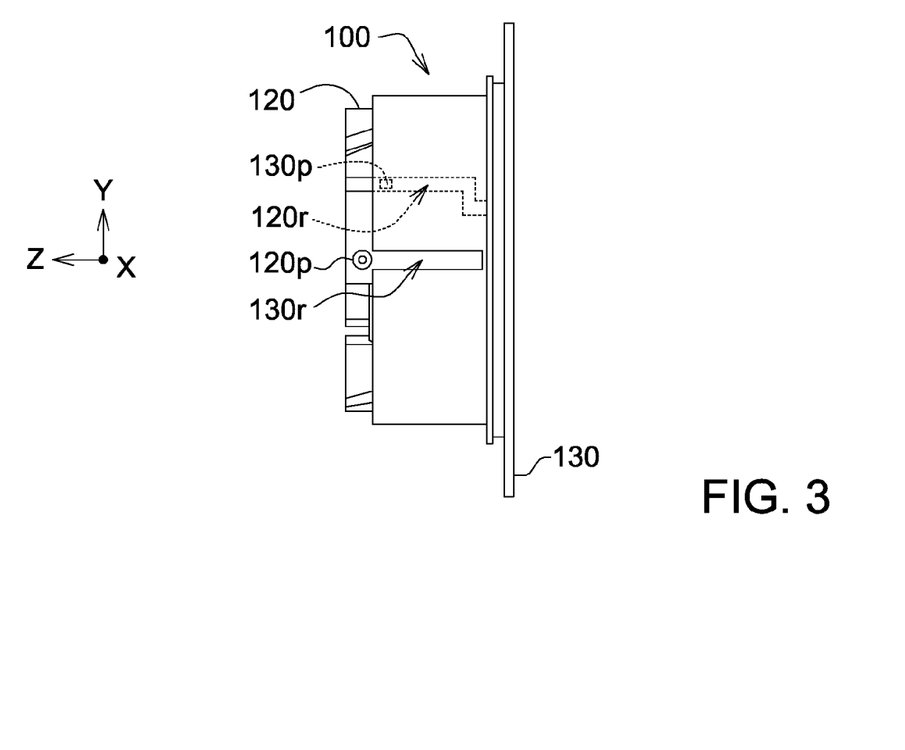
FIG. 3 shows a schematic diagram of a second barrel and a third barrel of FIG. 2 being in a close end.

Referring to FIG. 3, a schematic diagram of a second barrel 120 and a third barrel 130 of FIG. 2 being in a close end is shown. The second barrel 120 (inner barrel) is disposed within the third barrel 130 (outer barrel). When the lens structure 100 in a close end, despite that the first pin 120p of the second barrel 120 is detached from the second groove 130r of the third barrel 130, the second pin 130p of the third barrel 130 still slides in the first groove 120r of the second barrel 120 to make the second barrel 120 unable to rotate with respect to the third barrel 130.

Figure 4:
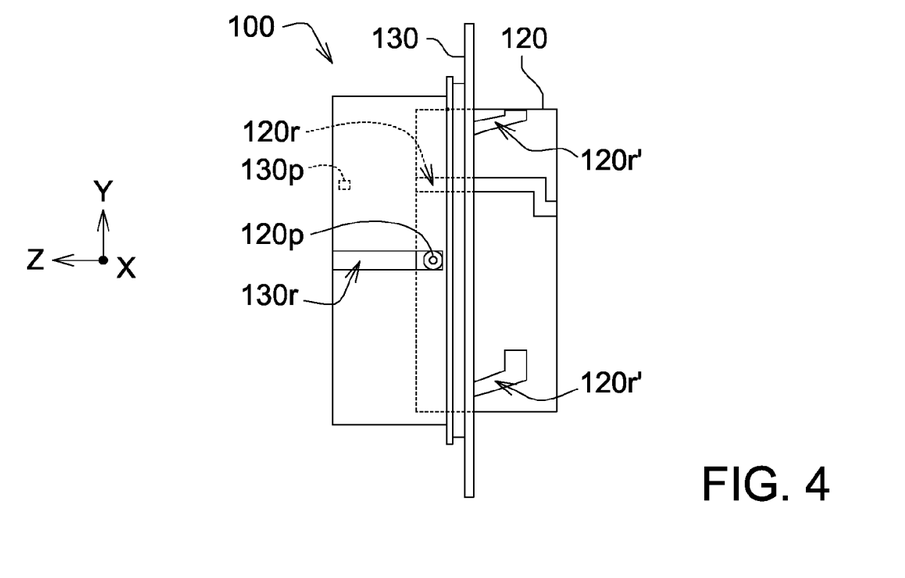
FIG. 4 shows a schematic diagram of a second barrel and a third barrel of FIG. 2 being in a wide-angle end.

Referring to FIG. 4, a schematic diagram of a second barrel 120 and a third barrel 130 of FIG. 2 in a wide-angle end is shown. When the lens structure 100 in a wide-angle end, despite that the second pin 130p of the third barrel 130 is detached from the first groove 120r of the second barrel 120, the first pin 120p of the second barrel 120 still slides along the second groove 130r of the third barrel 130 (the first pin 120p is restricted by the second groove 130r), making the second barrel 120 unable to rotate with respect to the third barrel 130.

Figure 5:
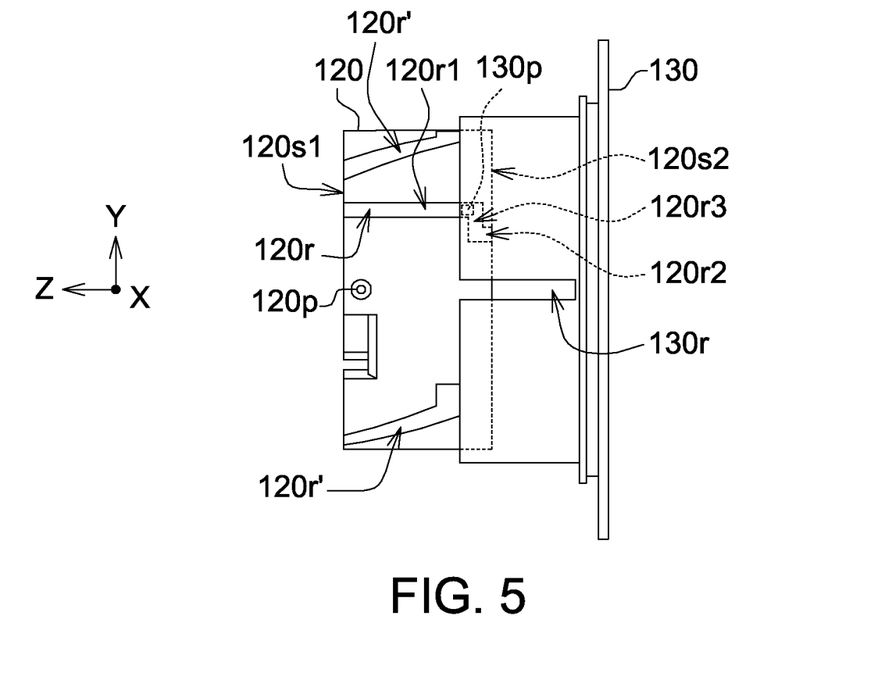
FIG. 5 shows a schematic diagram of a second barrel and a third barrel of being in a telephoto end.

Referring to FIG. 5, a schematic diagram of a second barrel 120 and a third barrel 130 of being in a telephoto end is shown. When the lens structure 100 in a telephoto end, despite that the first pin 120p of the second barrel 120 is detached from the second groove 130r of the third barrel 130, the second pin 130p still slides in the first groove 120r, making the second barrel 120 unable to rotate with respect to the third barrel 130.

As indicated in FIG. 5, the second barrel 120 has a first surface 120s1 and a second surface 120s2 opposite to the first surface 120s1. The first groove 120r of the second barrel 120 extends to the second surface 120s2 of the second barrel 120 from the first surface 120s1. In the present embodiment, the first groove 120r comprises a first straight groove 120r1, a second straight groove 120r2 and a first rotation groove 120r3. The first straight groove 120r1 extends to the first rotation groove 120r3 from the first surface 120s1 of the second barrel 120, the first rotation groove 120r3 extends to the second straight groove 120r2 along the outer circumferential direction of the second barrel 120, and the second straight groove 120r2 extends to the second surface 120s2 of the second barrel 120. Furthermore, the extension method of the first groove 120r is not restricted by the embodiment of the invention.

As indicated in FIG. 5, when the lens structure 100 in a telephoto end, the second pin 130p is positioned at the junction between the first straight groove 120r1 and the first rotation groove 120r3 of the first groove 120r. For example, the second pin 130p is positioned in the first straight groove 120r1. In the present embodiment, the second pin 130p may enter through the second straight groove 120r2, such that the third barrel 130 is conveniently disposed on the second barrel 120.

During the process in which the second barrel 120 moves with respect to the third barrel 130, it is either the first pin 120p of the second barrel 120 slides along the second groove 130r of the third barrel 130 or the second pin 130p of the third barrel 130 slides along the first groove 120r of the second barrel 120. In another embodiment, the action that the first pin 120p of the second barrel 120 slides along the second groove 130r of the third barrel 130 and the action that the second pin 130p of the third barrel 130 slides along the first groove 120r of the second barrel 120 may occur at the same time.

In addition, the number of the first groove 120r corresponds to that of the second pin 130p, and is such as three or any other numbers.

Figure 6:
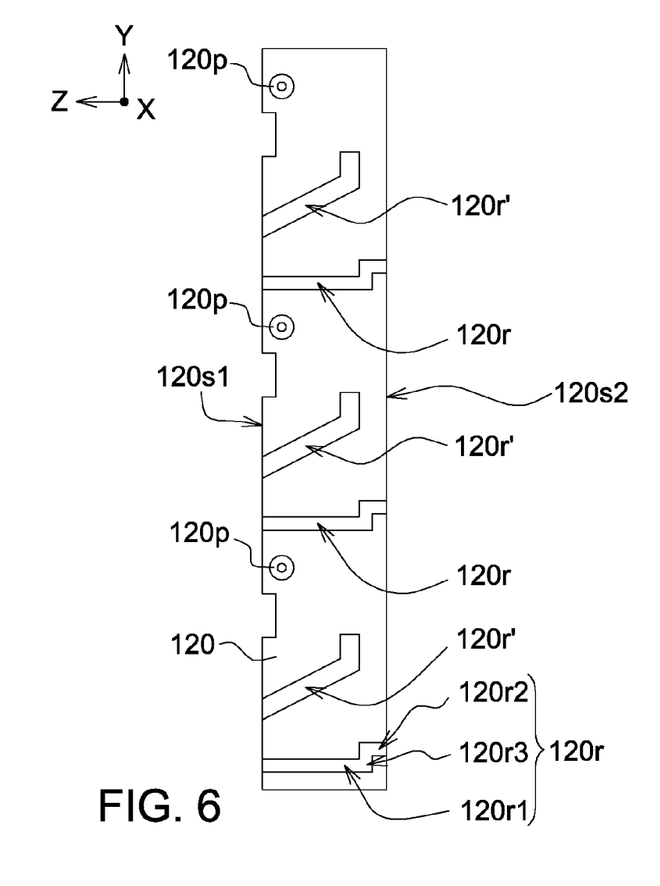
FIG. 6 shows an expansion diagram of the second barrel of FIG. 2.

Referring to FIG. 6, an expansion diagram of the second barrel of FIG. 2 is shown. The second barrel 120 has at least one fourth guiding groove 120r', and the third pin 110p of the first barrel 110 (FIG. 7) slides along the fourth guiding groove 120C of the second barrel 120.

To elaborate the present embodiment in greater details, "straight groove" denotes the groove structure allowing the barrel to move in a straight line, and "rotation groove" denotes the groove structure allowing the barrel to rotate. For example, the first straight groove 120r1 and the second straight groove 120r2 only extend along the Z-axis, and are thus able to guide the barrel connected thereto to move in a straight line, wherein, the Z-axis is such as the central axis of the barrels. In another example, the first sub-rotation groove 110r3 (FIG. 7) extends around the Z-axis, and is thus able to guide the barrel connected thereto to rotate, wherein, "extend around Z-axis" means "extend along the outer circumferential direction of a barrel", but the invention is not limited thereto.

Figure 7:
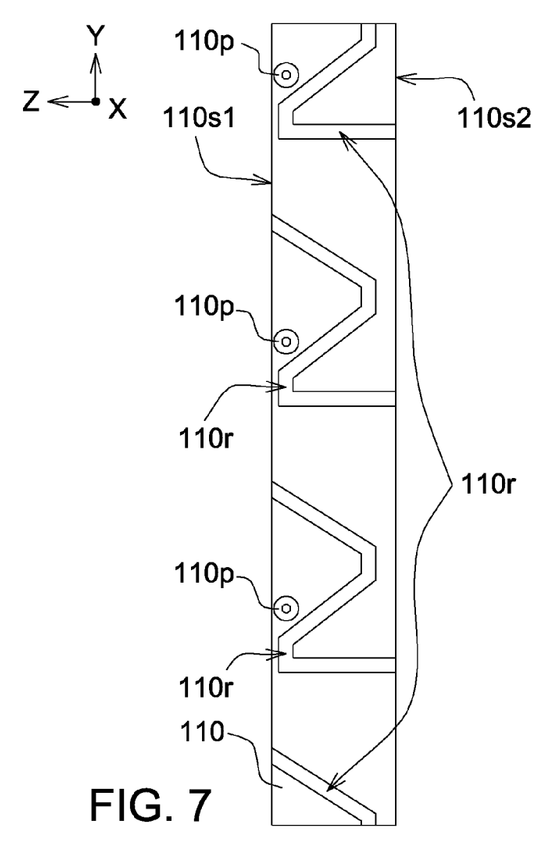
FIG. 7 shows an expansion diagram of the first barrel of FIG. 2.

Referring to FIG. 7, an expansion diagram of the first barrel of FIG. 2 is shown. The first barrel 110 has at least one third guiding groove 110r and comprises at least one third pin 110p, and the first pin 120p of the second barrel 120 slides along the second groove 130r of the third barrel 130 and the third guiding groove 110r of the first barrel 110.

Moreover, the numbers of the first pin 120p, the second groove 130r and the third guiding groove 110r are correspond to each other, and are such as three or any other numbers.

In the present embodiment, the third guiding groove 110r of the first barrel 110 and the first groove 120r of the second barrel 120 define a continuous optical zooming path. To put it in greater details, the third guiding groove 110r and the first groove 120r are two independent curve-shaped guiding grooves. In the zooming process, the first barrel 110 and the second barrel 120 rotate with respect to each other and/or move forward. When the first barrel 110 and the second barrel 120 are at a predetermined angle and position, the first groove 110r and the second groove 120r are connected as a continuous curve-shaped guiding groove to form an optical zooming path.

Figure 8:
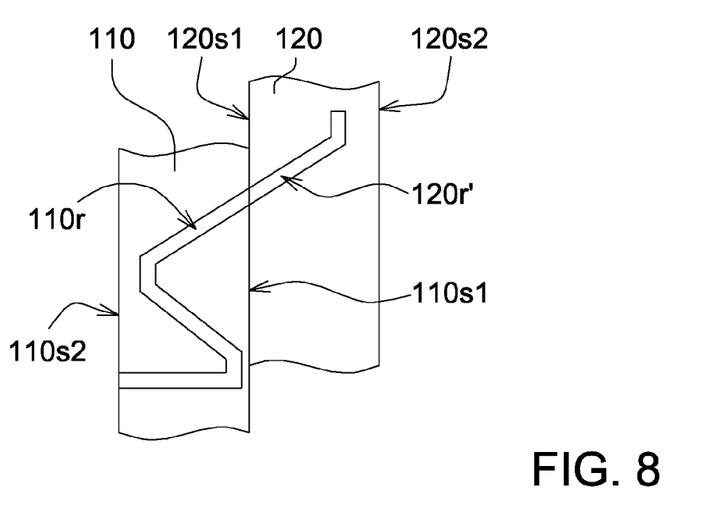
FIG. 8 shows a schematic diagram of an optical zooming path defined by a third guiding groove of FIG. 7 and a fourth guiding groove of FIG. 6.

Referring to FIG. 8, a schematic diagram of an optical zooming path defined by a third guiding groove of FIG. 7 and a fourth guiding groove of FIG. 6 is shown. When the first surface 110s1 of the first barrel 110 is connected to the first surface 120s1 of the second barrel 120, the third guiding groove 110r is connected to the fourth guiding groove 120C so as to define an optical zooming path. Preferably but not restrictively, the third guiding groove 110r and the fourth guiding groove 120r' are smoothly connected. That is, the junction between the third guiding groove 110r and the fourth guiding groove 120r' is not a sharp bending, but the invention is limited thereto.

Since the continuous optical zooming path may be defined by the guiding grooves of different barrels, the length of the continuous optical zooming path is increased. Furthermore, the continuous optical zooming path may be defined by the guiding grooves of different barrels. Under the circumstance that the length of the optical zooming path remains the same or is increased, the thicknesses of the first barrel 110, the second barrel 120 and the third barrel 130 may be reduced, such that both the volume and the weight of the lens structure 100 are reduced accordingly.

Figure 9A:
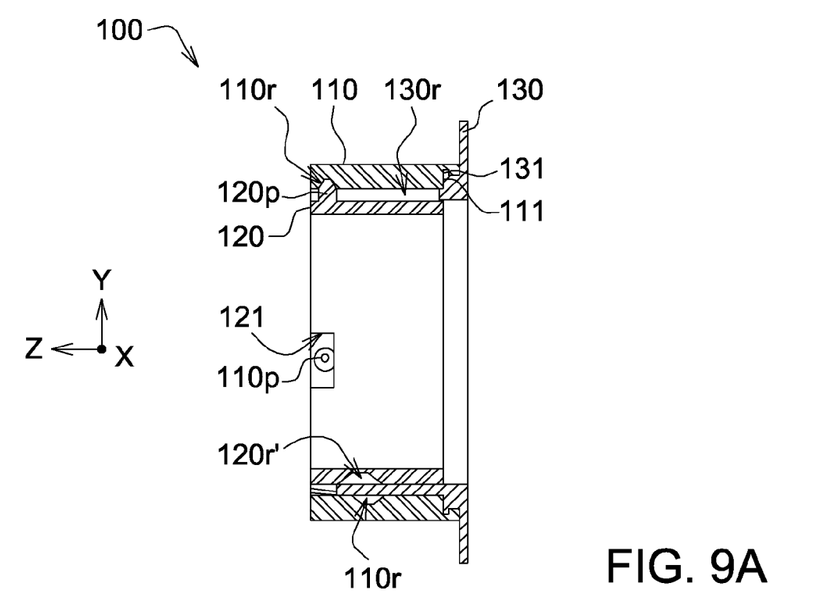
FIG. 9A shows a cross-sectional view of the lens structure of FIG. 2 assembled in a close end.

Referring to FIG. 9A, a cross-sectional view of the lens structure of FIG. 2 assembled in a close end is shown. The first barrel 110 is rotatably disposed outside of the third barrel 130. The second barrel 120 is disposed inside of the third barrel 130 and the first pin 120p of the second barrel 120 slides along the third guiding groove 110r of the first barrel 110 and the second groove 130r of the third barrel 130.

As indicated in FIG. 9A, the first barrel 110 comprises a rotation portion 111, the third barrel 130 comprises a rotation portion 131, and the rotation portion 111 is rotatably connected to the rotation portion 131 such that the first barrel 110 and the third barrel 130 may rotate with respect to each other around the Z-axis. In the present embodiment, the rotation portion 111 is such as a sliding groove, and the rotation portion 131 is such as a sliding rail. In another embodiment, the rotation portion 111 is such as a sliding rail, and the rotation portion 131 is such as a sliding groove. With the rotation portion 111 being engaged with the rotation portion 131, the first barrel 110 and the third barrel 130 cannot shift relatively along the Z-axis. In addition, the first pin 120p of the second barrel 120 slides along the second groove 130r of the third barrel 130 and the third guiding groove 110r of the first barrel 110, so that the second barrel 120 moves forward along the Z-axis when the first barrel 110 rotates around the Z-axis.

As indicated in FIG. 9A, the second barrel 120 has at least one gap 121. When the lens structure is at a close end, the first pin 110p of the first barrel 110 is positioned inside the gap 121. Through the design of the gap 121, the second barrel 120 will not interfere with the first pin 110p. In another embodiment, the gap 121 may be omitted. For example, the first barrel 110 and the second barrel 120 are separated by an interval in which the first pin 110p is positioned. Therefore, even when the gap 121 is omitted, the second barrel 120 will not interfere with the first pin 110p either. Besides, the number of the gap 121 corresponds to that of the first pin 110p, and is such as three or any other numbers.

Figure 9B:
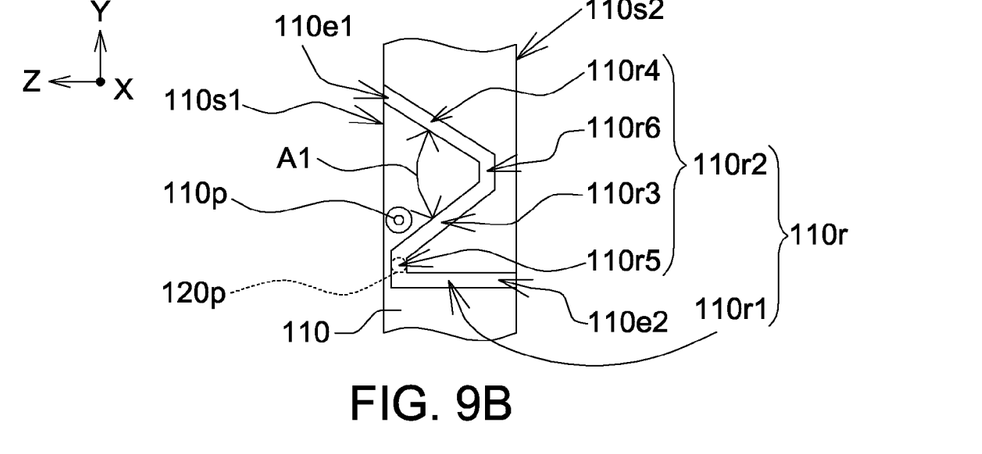
FIG. 9B shows a schematic diagram of the first pin of FIG. 9A being positioned at a third guiding groove of FIG. 7.

Referring to FIG. 9B, a schematic diagram of the first pin of FIG. 9A being positioned at a third guiding groove of FIG. 7 is shown. The first barrel 110 has a first surface 110s1 and a second surface 110s2 opposite to each other. The first surface 120s1 of the second barrel 120 (FIG. 2) and the first surface 110s1 of the first barrel 110 substantially faces the same direction. The third guiding groove 110r extends to the second surface 110s2 from the first surface 110s1. The third guiding groove 110r may move reciprocally between the first surface 110s1 and the second surface 110s2. In the present embodiment, the third guiding groove 110r comprises a third straight groove 110r1 and a second rotation groove 110r2. The first straight groove 110r1 extends to the first rotation groove 110r2 from the second surface 110s2 of the first barrel 110, and the first rotation groove 110r2 extends to the first surface 110s1 of the first barrel 110. In addition, the extension of the first groove 110r is not restricted by the exemplifications in the embodiments of the invention.

As indicated in FIG. 9B, the second rotation groove 110r2 comprises a first sub-rotation groove 110r3, a second sub-rotation groove 110r4, a third sub-rotation groove 110r5 and a fourth sub-rotation groove 110r6. In the present embodiment, the third sub-rotation groove 110r5 connects the first sub-rotation groove 110r3 and the third straight groove 110r1, such that the third straight groove 110r1 is connected to the first sub-rotation groove 110r3 through the third sub-rotation groove 110r5. In another embodiment, the first rotation groove 110r2 may also omit the third sub-rotation groove 110r5, such that the first straight groove 110r1 directly extends to the first sub-rotation groove 110r3 from the second surface 110s2 of the first barrel 110. In the present embodiment, the fourth sub-rotation groove 110r6 connects the first sub-rotation groove 110r3 and the second sub-rotation groove 110r4, such that the first sub-rotation groove 110r3 is connected to the second sub-rotation groove 110r4 through the fourth sub-rotation groove 110r6. In another embodiment, the first rotation groove 110r2 may also omit the fourth sub-rotation groove 110r6, such that the first sub-rotation groove 110r3 is directly connected to the second sub-rotation groove 110r4.

As indicated in FIG. 9B, when the lens structure in a close end, the second pin 120p of the second barrel 120 is positioned inside the first straight groove 110r1 or the first rotation groove 110r2 of the first barrel 110. In the present embodiment, the second pin 120p is exemplified as being positioned inside the third sub-rotation groove 110r5.

As indicated in FIG. 9B, the second sub-rotation groove 110r4 extends to the first surface 110s1 of the first barrel 110, wherein, an acute angle A1 is contained between the first sub-rotation groove 110r3 and the second sub-rotation groove 110r4. To put it in greater details, the first sub-rotation groove 110r3 and the second sub-rotation groove 110r4 form a V-shaped guiding groove. In another embodiment, the first sub-rotation groove 110r3 is substantially parallel to the second sub-rotation groove 110r4 and forms a U-shaped guiding groove with the second sub-rotation groove 110r4.

As indicated in FIG. 9B, the third guiding groove 110r has a first end 110e1 and the second end 110e2. The first end 110e1 and the third pin 110p are adjacent to the same lateral side (such as the first surface 110s1) of the first barrel 110.

As indicated in FIG. 9B, the first end 110e1 and the second end 110e2 of the third guiding groove 110r respectively extend to the first surface 110s1 and the second surface 110s2 of the first barrel 110, and form openings on the first surface 110s1 and the second surface 110s2. To put it in greater details, the first groove 110r is a guiding groove with two open ends. Since the two ends of the first groove 110r are open, the second pin 120p may enter the first groove 110r through the opening of the first groove 110r such that the second barrel 120 is conveniently disposed inside of the first barrel 110.

Figure 10A:
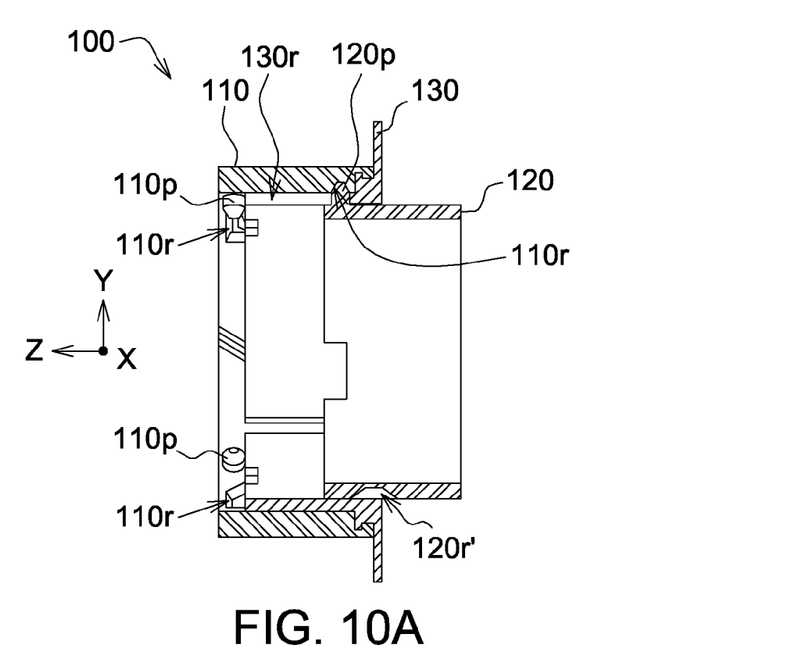
FIG. 10A shows a cross-sectional view of the lens structure of FIG. 9A being in a wide-angle end.
Figure 10B:
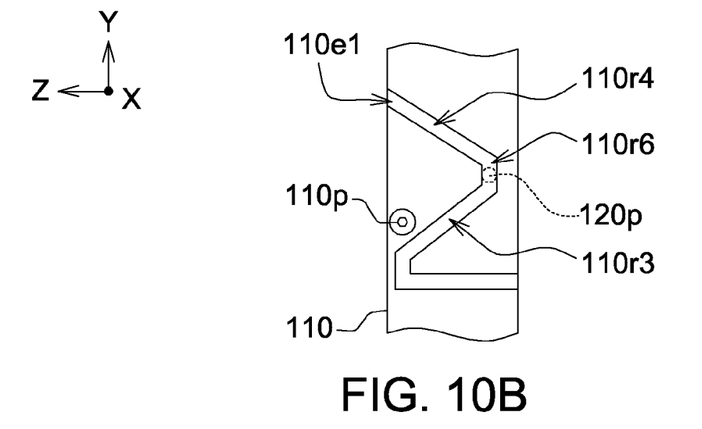
FIG. 10B shows a schematic diagram of the first pin of FIG. 10A being positioned at a third guiding groove of FIG. 7.

Referring to FIGS. 10A and 10B. FIG. 10A shows a cross-sectional view of the lens structure of FIG. 9A being in a wide-angle end. FIG. 10B shows a schematic diagram of the first pin of FIG. 10A being positioned at a third guiding groove of FIG. 7.

As indicated in FIG. 10A, during the process in which the first barrel 110 is rotated around the Z-axis from the position as indicated in FIG. 9A to the position as indicate in FIG. 10A, the first pin 120p of the second barrel 120 slides along the second groove 130r of the third barrel 130 and the third guiding groove 110r of the first barrel 110 and drives the second barrel 120 to move towards the negative Z-axis. Meanwhile, the lens structure 100 (FIG. 10A) is in a wide-angle end. During the process in which the second barrel 120 is moved from the position as indicated in FIG. 9A to the position as indicated in FIG. 10A, the first pin 120p slides to the junction between the first sub-rotation groove 110r3 and the second sub-rotation groove 110r4 from the third sub-rotation groove 110r5 (FIG. 9A). The junction is such as the fourth sub-rotation groove 110r6 (FIG. 10B).

Figure 11A:
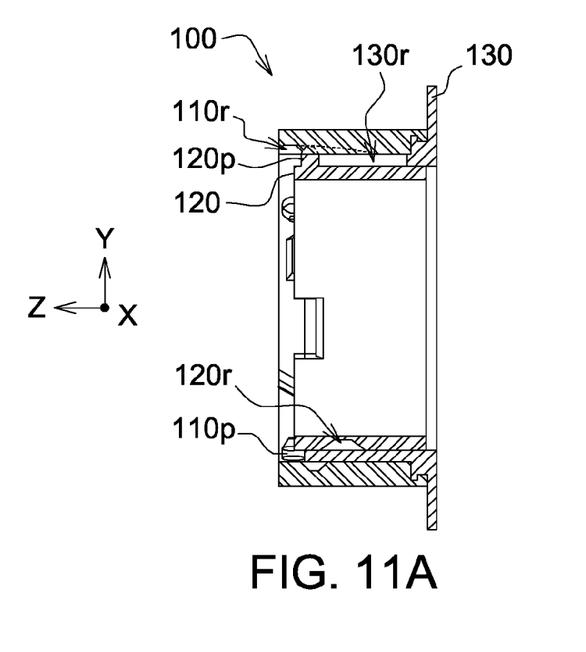
FIG. 11A shows a cross-sectional view of the process of the lens structure of FIG. 10A being changed to a telephoto end.
Figure 11B:
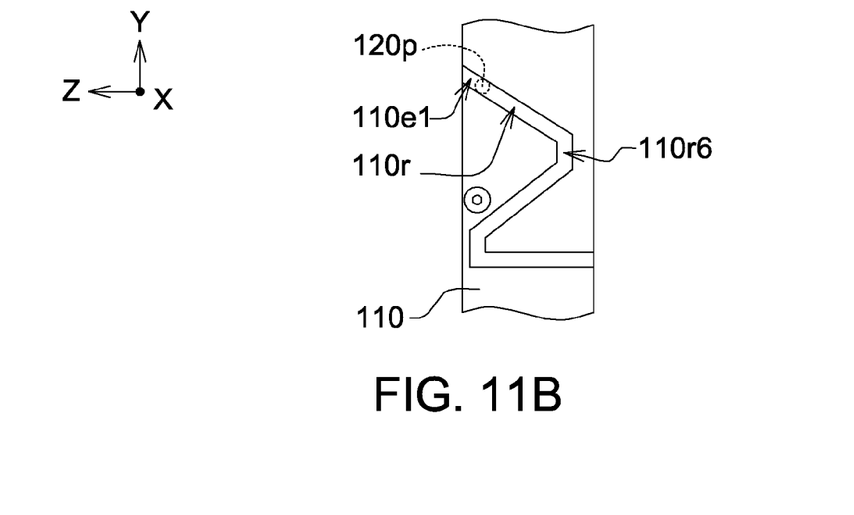
FIG. 11B shows a schematic diagram of a first pin of FIG. 11A positioned at a third guiding groove of FIG. 7.
Figure 11C:
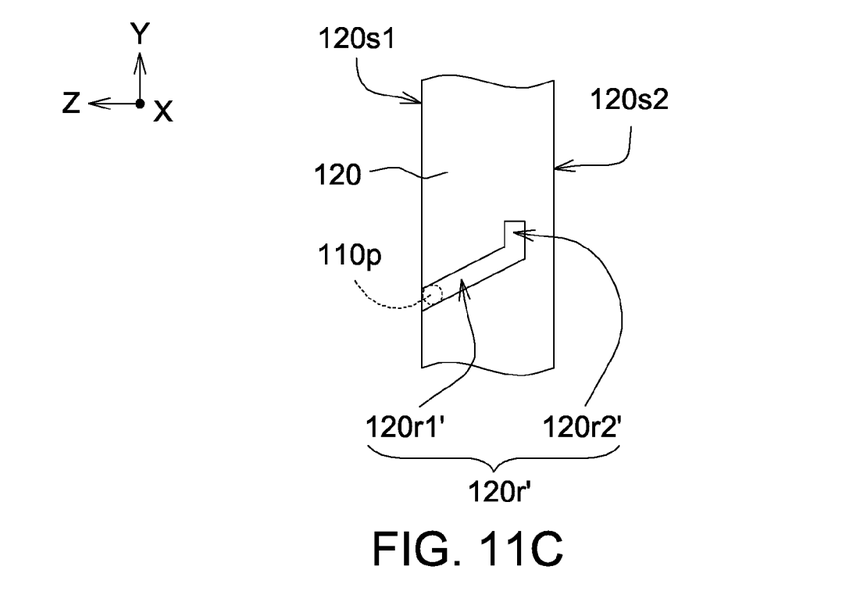
FIG. 11C shows a schematic diagram of a third pin of FIG. 11A being positioned at a fourth guiding groove of FIG. 6.

Referring to FIGS. 11A-11C. FIG. 11A shows a cross-sectional view of the process of the lens structure of FIG. 10A being changed to a telephoto end. FIG. 11B shows a schematic diagram of a first pin of FIG. 11A positioned at a third guiding groove of FIG. 7. FIG. 11C shows a schematic diagram of a third pin of FIG. 11A being positioned at a fourth guiding groove of FIG. 6.

As indicated in FIG. 11A, during the process in which the first barrel 110 is rotated from the position as indicated in FIG. 10A to the position as indicated in FIG. 11A, the first pin 120p of the second barrel 120 slides along the second groove 130r of the third barrel 130 and the third guiding groove 110r of the first barrel 110, and drives the second barrel 120 to move in a straight line towards the positive Z-axis until the position as indicated in FIG. 11A is reached. During the process in which the second barrel 120 is shifted from the position as indicated in FIG. 10A to the position as indicated in FIG. 11A, the first pin 120p (FIG. 10B) slides to the first end 110e1 of the third guiding groove 110r from the fourth sub-rotation groove 110r6 as indicated in FIG. 11B. When the second barrel 120 continues to rotate as indicated in FIG. 11C, the third pin 110p of the first barrel 110 starts to enter the fourth guiding groove 120C of the second barrel 120. Meanwhile, the first pin 120p of FIG. 11A may be detached from the third guiding groove 110r (for example, the second pin 120p slides to the outside of the first barrel 110). In another embodiment the first pin 120p may remain being connected to the first groove 110r.

As indicated in FIG. 11C, the fourth guiding groove 120r' may extend to one of the first surface 120s1 and the second surface 120s2. In the present embodiment, the fourth guiding groove 120r' is exemplified as extending to the first surface 120s1. That is, one end of the second groove 120r has an opening on the first surface 120s1.

As indicated in FIG. 11C, the fourth guiding groove 120r' comprises a third rotation groove 120r1' and a fourth rotation groove 120r2', wherein the third rotation groove 120r1' is connected to the fourth rotation groove 120r2'. The third rotation groove 120r1' extends to the fourth rotation groove 120r2 from the first surface 120s1 of the second barrel 120 in a direction towards the second surface the second surface 120s2. In another embodiment, the fourth guiding groove 120C may also omit the fourth rotation groove 120r2'.

Figure 12A:
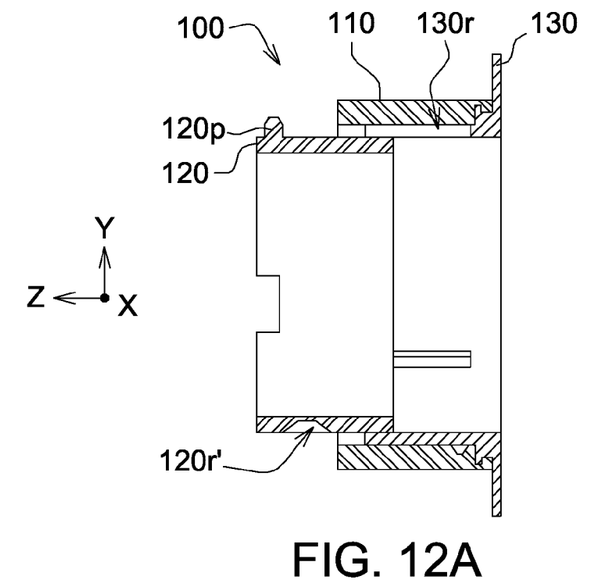
FIG. 12A shows a cross-sectional view of the process of the lens structure of FIG. 11A being changed to a telephoto end.
Figure 12B:
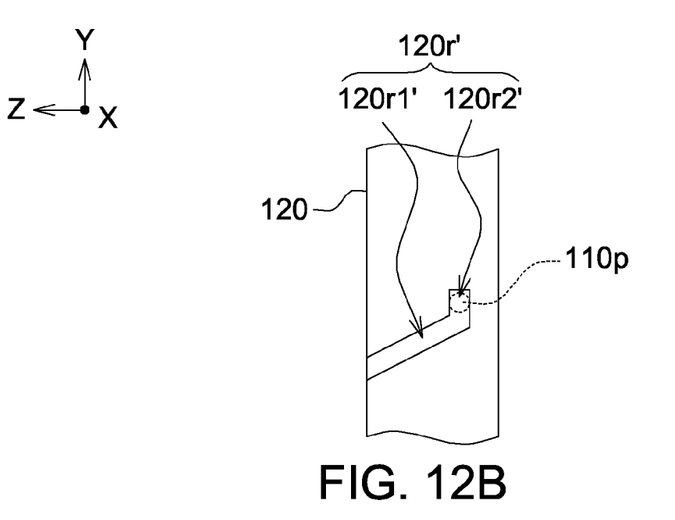
FIG. 12B shows a schematic diagram of third pin of FIG. 12A being positioned at a fourth guiding groove of FIG. 6.

Referring to FIGS. 12A and 12B. FIG. 12A shows a cross-sectional view of the process of the lens structure of FIG. 11A being changed to a telephoto end. FIG. 12B shows a schematic diagram of third pin of FIG. 12A being positioned at a fourth guiding groove of FIG. 6. Since the third pin 110p of FIG. 12A is shielded by the second barrel 120, the third pin 110p is not illustrated in FIG. 12A.

As indicated in FIG. 12A, during the process in which the first barrel 110 is rotated around the Z-axis from the position as indicated in to the position as indicated in FIG. 11A, the first pin 120p of the second barrel 120 is detached from the third guiding groove 110r of the first barrel 110 (for example, the first pin 120p slides to the outside of the first barrel 110). Meanwhile, the third pin 110p of the first barrel 110 (FIG. 11C) enters the fourth guiding groove 120r' of the second barrel 120 and slides along the fourth guiding groove 120C, such that the second barrel 120 continues to slide along the Z-axis until the telephoto end as indicated in FIG. 12A is reached.

As indicated in FIG. 12B, when the lens structure 100 in a telephoto end, the third pin 110p is such as positioned at the fourth rotation groove 120r2' of the fourth guiding groove 120C.

A lens structure and an image capturing device using the same are disclosed in above embodiments of the invention. During the process in which the second barrel moves with respect to the third barrel, it is either the first pin of the second barrel slides along the second groove of the third barrel 130r or the second pin of the third barrel slides along the first groove of the second barrel 120r. In another embodiment, the action that the first pin of the second barrel slides along the second groove of the third barrel and the action that the second pin of the third barrel slides along the first groove of the second barrel may occur at the same time.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens structure, comprising:
   a first barrel;
   a second single barrel comprising a first groove and a first pin; and
   a third single barrel comprising a second groove and a second pin;
   wherein, the first barrel is disposed outside of the third single barrel, and the second single barrel is disposed inside of the third single barrel; and
   wherein, between a wide-angle end and a telephoto end, the second pin slides along the first groove while the first pin is detached from the second groove, and the first pin slides along the second groove while the second pin is detached from the first groove.

2. The lens structure according to claim 1, wherein the second single barrel comprises a first surface and a second surface, and the first groove extends to the second surface from the first surface.

3. The lens structure according to claim 2, wherein the first groove comprises a first straight groove, a second straight groove and a first rotation groove, the first straight groove extends to the first rotation groove from the first surface, the first rotation groove extends to the second straight groove along a circumferential direction of the second single barrel, and the second straight groove extends to the second surface.

4. The lens structure according to claim 1, wherein the first barrel comprises a third groove, and the first pin slides along the second groove and/or the third groove.

5. The lens structure according to claim 4, wherein the first barrel comprises a third pin, and the second pin enters the first groove when the first pin is detached from the second groove.

6. The lens structure according to claim 1, wherein the second single barrel comprises a fourth groove, and the first barrel comprises a third pin, which slides along the fourth groove.

7. The lens structure according to claim 6, wherein the second single barrel comprises a first surface and a second surface, the fourth groove comprises a third rotation groove and a fourth rotation groove, the third rotation groove is connected to the fourth rotation groove, and the third rotation groove extends to the fourth rotation groove in a direction from the first surface towards the second surface.

8. The lens structure according to claim 1, wherein the first barrel comprises a third groove, the first barrel comprises a first surface and a second surface, the third groove extends to the second surface from the first surface, the third groove comprises a third straight groove and a second rotation groove, the third straight groove extends to the second rotation groove from the second surface, and the second rotation groove extends to the first surface.

9. The lens structure according to claim 8, wherein the second rotation groove comprises a first sub-rotation groove and a second sub-rotation groove, the third straight groove extends to the first sub-rotation groove from the second surface, the first sub-rotation groove is connected to the second sub-rotation groove, the second sub-rotation groove extends to the first surface, and an acute angle is contained between the first sub-rotation groove and the second sub-rotation groove.

10. The lens structure according to claim 9, wherein the second rotation groove further comprises a third sub-rotation groove and a fourth sub-rotation groove, the third sub-rotation groove connects the first sub-rotation groove and the third straight groove, and the fourth sub-rotation groove connects the first sub-rotation groove and the second sub-rotation groove.

11. A lens structure, comprising:
an inner single barrel comprising a first groove group and a first pin group; and
an outer single barrel comprising a second groove group and a second pin group;
wherein, between a wide-angle end and a telephoto end, the second pin group slides along the first groove group while the first pin group is detached from the second groove group, and the first pin group slides along the second groove group while the second pin group is detached from the first groove group.

12. The lens structure according to claim 11, wherein the second pin group slides along the first groove group while the first pin group is detached from the second groove group, and the first pin group slides along the second groove group while the second pin group is detached from the first groove group.

13. The lens structure according to claim 11, wherein the inner single barrel comprises a first surface and a second surface, the outer single barrel comprises a third surface, the first groove group extends to the second surface from the first surface, and the second groove group extends from the third surface.

14. The lens structure according to claim 13, wherein the first groove group comprises at least one first groove, the second groove group comprises at least one second groove, the first pin group comprises at least one first pin, and the second pin group comprises at least one second pin.

15. The lens structure according to claim 14, wherein the first groove comprises a first straight groove, a second straight groove and a first rotation groove, the first straight groove extends to the first rotation groove from the first surface, the first rotation groove extends to the second straight groove along a circumferential direction of the inner single barrel, and the second straight groove extends to the second surface.

16. An electronic apparatus comprising the lens structure claimed in claim 11.

17. A lens structure comprising an inner barrel and an outer barrel, the inner barrel comprising a first pin group and a first groove group, the outer barrel comprising a second pin group and a second groove group, wherein, between a wide-angle end and a telephoto end, while the first pin group is detached from the second groove group, the second pin group slides along the first groove group, and while the second pin group is detached from the first groove group, the first pin group slides along the second groove group.

18. The lens structure according to claim 17, wherein the inner barrel comprises a first surface and a second surface, the outer barrel comprises a third surface, the first groove group extends to the second surface from the first surface, and the second groove group extends from the third surface 19. The lens structure according to claim 17, the lens structure further comprises a first barrel disposed outside of the outer barrel, wherein the first barrel comprises a third groove group, and the first pin group slides in accordance with the second groove group and the third groove group.

20. The lens structure according to claim 19, wherein the inner barrel comprises a first surface and a second surface, the first groove group comprises at least one first groove, the second groove group comprises at least one second groove, the first pin group comprises at least one first pin, the second pin group comprises at least one second pin, the first groove comprises a first straight groove, a second straight groove and a first rotation groove, the first straight groove extends to the first rotation groove from the first surface, the first rotation groove extends to the second straight groove along a circumferential direction of the inner barrel, and the second straight groove extends to the second surface.

* * * * *